United States Patent

Stancliffe et al.

Patent Number: 6,068,076
Date of Patent: May 30, 2000

[54] ANTI-THEFT DEVICE

[76] Inventors: John Stancliffe, Barcliffe House, Barncliffe Hill, Shelley, Huddersfield HD8 8NA, United Kingdom; Paul Carr, 152 Helm Lane, Meltham, Huddersfield HD7 3R1, United Kingdom

[21] Appl. No.: 09/029,959

[22] PCT Filed: Jun. 6, 1997

[86] PCT No.: PCT/GB97/01746

§ 371 Date: Mar. 6, 1998

§ 102(e) Date: Mar. 6, 1998

[87] PCT Pub. No.: WO98/01324

PCT Pub. Date: Jan. 15, 1998

[30] Foreign Application Priority Data

Jul. 6, 1996 [GB] United Kingdom ............... 9614245

[51] Int. Cl.⁷ .................................................. B60R 25/00
[52] U.S. Cl. ................................................. 180/287; 116/33
[58] Field of Search ............................. 180/287; 116/33

[56] References Cited

U.S. PATENT DOCUMENTS

| 1,329,210 | 1/1920 | Rickon | 116/33 |
| 1,335,827 | 4/1920 | Finn | 116/33 |
| 3,661,115 | 5/1972 | Rosenstein | 180/287 |
| 3,688,257 | 8/1972 | Mann | 180/287 |
| 4,375,200 | 3/1983 | Bertani et al. | 180/287 |
| 4,818,029 | 4/1989 | Moutor et al. | 180/287 |

FOREIGN PATENT DOCUMENTS

| 956832 | 1/1957 | Germany . |
| 3101645 | 8/1982 | Germany . |
| 4014378 | 11/1991 | Germany . |

*Primary Examiner*—Kenneth R. Rice
*Attorney, Agent, or Firm*—Klauber & Jackson

[57] ABSTRACT

A vehicle theft prevention device (10) arranged to be fitted to the air inlet/outlet of a vehicle tire includes a motion detector (11) and an air release means (12). The device (10) can be armed so that, in use, a solenoid controlled valve (13) in the air release means (12) is arranged to be opened when the motion detector (11) senses movement. If movement is detected air held under pressure in the tire is allowed to escape and the vehicle is disabled. The device (10) may be disarmed so that an authorized user may use the vehicle without unnecessary deflation of one or more tires of the vehicle. The device (10) also includes a standard maintenance valve (14) for adjusting the air pressure of a tire in normal use.

26 Claims, 1 Drawing Sheet

ANTI-THEFT DEVICE

This invention relates to a vehicle theft prevention device and to a method of preventing the theft of a vehicle.

Previous attempts at providing a device to prevent the theft of a vehicle have included devices to release the pressurised air in a tyre through the valve of the tyre when the centrifugal force on the device due to the rotation of the wheel exceeded a certain amount. Devices of this type have various disadvantages associated with them. For instance, the immobilising effect of the device could be overridden by injecting foam or some similar substance into the valve through which the air was being released. This would result in a temporarily inflated tyre. The vehicle could then be removed to a location where the wheel could be replaced. Consequently, the effectiveness of these prior art theft prevention devices is severely limited. Additionally, the prior art devices must be manually activated and deactivated which can result in the disadvantage of a person possibly forgetting to deactivate the mechanism. In this situation one or more tyres of the vehicle would deflate unnecessarily. Further, an unauthorised person may be able to deactivate the device by using force. A person using the device would also be likely to dirty their hands because of the manual actuation that is required. When a number of the prior art devices are fitted to a vehicle, a considerable amount of time would be taken up in activating and deactivating the devices individually.

It is an object of the present invention to address the above mentioned disadvantages.

According to one aspect of the present invention a vehicle theft prevention device comprises motion sensing means for sensing the motion of a wheel of a vehicle and discharge means for discharging pressurised fluid from a tyre of the wheel when motion of the wheel is detected.

The device may additionally include a maintenance valve, which maintenance valve may be operable to allow fluid into and out of the tyre. Said maintenance valve may be one of the types commonly used on motor vehicle tyres. In use, the maintenance valve may protrude from the wheel of the vehicle for easy access. The maintenance valve and the discharge means may be separate parts of the device.

The maintenance valve may include a secondary valve. Said secondary valve may be in addition to the means for adjusting the pressure in the tyre. The secondary valve may be controllable electro-mechanically. The secondary valve may be controllable electrically. The secondary valve may be controllable electronically. The secondary valve may be controlled by the control means. The secondary valve may comprise a solenoid switch.

The motion sensing means may be electro-mechanical. The motion sensing means may be electrically powered. The motion sensing means may be electronic. The motion sensing means may comprise a rocker switch. The motion sensing means may comprise a mercury switch. The motion sensing means may be arranged to activate the discharge means. The motion sensing means may be arranged to activate the discharge means when the motion sensing means has, in use, sensed the motion of the wheel. Preferably, the discharge means is arranged to be activated when the motion sensing means detects that the wheel has turned through approximately one quarter of a revolution.

The vehicle theft prevention device may include a control means. The control means may be connected to the motion sensing means. The control means may be connected to the discharge means. The control means may control the discharge means dependent upon signals from the motion sensing means. The control means may cause pressurised fluid to be discharged from the tyre when the motion sensing means senses motion.

The discharge means may include a valve. The valve may be operable between open and closed positions. The valve may be controllable electro-mechanically. The valve may be controllable electrically. The valve may be controlled electronically. The valve may be controlled by a solenoid switch.

The discharge means may be arranged to be located inwardly of the maintenance valve. The discharge means may be arranged to protrude from an inner portion of the wheel. The discharge means may protrude substantially towards the rotational axis of the wheel. Accordingly, the device may be arranged such that the wheel restricts access to the discharge means. The valve of the discharge means may comprise a one-way valve. The one-way valve may be arranged to allow fluid to exit the valve only.

The device may be arranged to be switched between an activated state where the discharge means is arranged to discharge fluid from the tyre and a deactivated state. In the deactivated state the device may be arranged to utilise substantially no power. In the deactivated state the device may be arranged such that the motion sensing means cannot activate the discharge means. When the device is in its deactivated state the secondary valve in the maintenance valve may remain open. Alternatively, the secondary valve in the maintenance valve may remain closed independently of the activated or deactivated status of the device until a signal is passed to the secondary valve in the maintenance valve to open said secondary valve.

The device may be switched between activated and deactivated states by remote control means. The secondary valve in the maintenance valve may be opened and closed by remote control means. The remote control means may be arranged to use coded signals. The remote control means may comprise a wireless transmitter and a wireless receiver. The wireless receiver may be associated with the control means. The wireless receiver may be associated, in use, with a peripheral section of the wheel. The remote control means may comprise electromagnetic transmitter and receiver means, which may be infra-red transmitter and receiver means. The remote control means may comprise acoustic transmitter and receiver means, which may be ultrasonic transmitter and receiver means. The remote control means may be combined with a remote control for an anti-theft alarm. The discharge means may be arranged to emit an alarm sound, which may be a screeching sound, when discharging fluid. The audible sound may act as an alarm.

According to another aspect of the present invention a wheel comprises at least one theft prevention device as described in any other aspect of the present invention.

According to a further aspect of the present invention a method of preventing the theft of a vehicle comprises providing motion sensing means for sensing the motion of a wheel of a vehicle and discharge means for discharging pressurised fluid from a tyre of the vehicle when motion of the wheel is detected.

The method may include the device additionally including a maintenance valve, which maintenance valve may be operable to allow air into and out of the tyre.

The method may include the discharge means being arranged to be located inwardly of the maintenance valve.

According to a still further aspect of the present invention a method of preventing the theft of a vehicle comprises fitting a device as described in any other aspect of the present invention to the wheel of a vehicle.

The present invention may be brought into practice in various ways but three embodiments will now be described by way of example with reference to the accompanying drawings in which.

Figure 1:
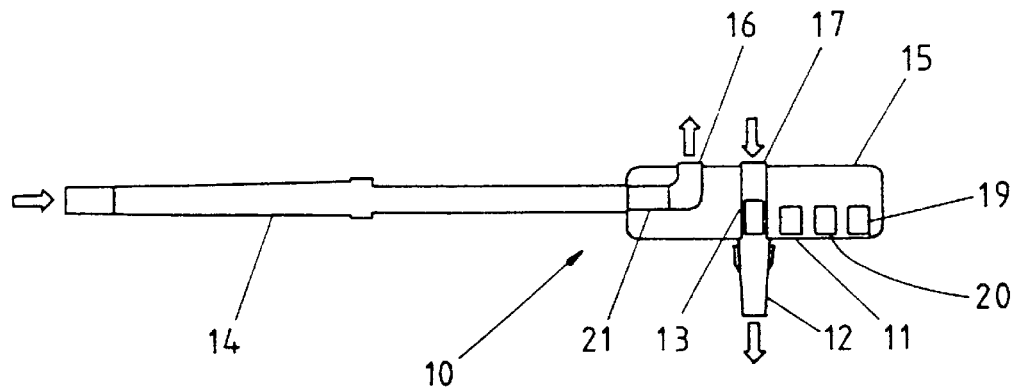
FIG. 1 is a schematic side view of a vehicle theft prevention device.

A vehicle theft prevention device 10 arranged to be fitted to the air inlet/outlet of a vehicle tyre includes a motion detector 11 and an air release means 12. The device 10 can be armed so that, in use, a solenoid controlled valve 13 in the air release means 12 is arranged to be opened when the motion detector 11 senses movement. If movement is detected air held under pressure in the tyre is allowed to escape and the vehicle is disabled. The device 10 may be disarmed so that an authorised user may use the vehicle without unnecessary deflation of one or more of the tyres of the vehicle. The device 10 also includes a standard maintenance valve 14 for adjusting the air pressure of a tyre in normal use.

Figure 2:
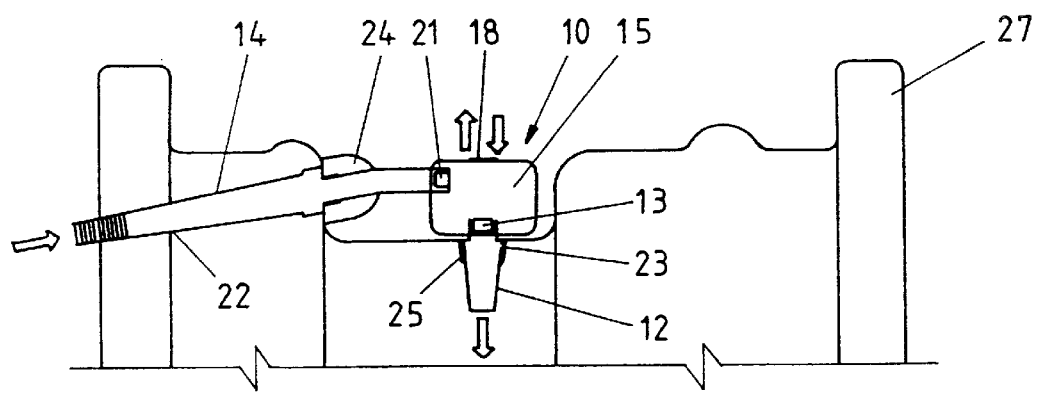
FIG. 2 is a schematic view of a vehicle theft prevention device fitted to a wheel of a vehicle.

Referring in greater detail to FIG. 1, the theft prevention device 10 comprises a rubber sealed main body 15. The air release means 12 and the maintenance valve 14 protrude from the main body 15. The device is arranged to be attached to the air inlet/outlet of a tyre via the two openings 16 and 17 shown in FIG. 1. Alternatively, the device may be attached to the air outlet/inlet of a tyre by the single opening 18 shown in FIG. 2. In FIG. 2 the single opening 18 allows air both into and out of a tyre, whereas in FIG. 1 the opening 16 allows air into a tyre and the opening 17 allows air out of a tyre.

A computer chip 19 is powered by a battery 20. The computer chip 19 is connected to the solenoid controlled valve 13 in the air release means 12 and to a secondary, solenoid controlled valve 21 in the maintenance valve. The computer chip 19 includes a remote sensor which may be used to receive signals from a remote transmitter (not shown) to activate or deactivate the vehicle theft prevention device 10.

The motion sensor 11 is also housed in the rubber sealed main body 15. The motion sensor may take the form of a mercury switch or a rocker type switch, although other types of motion sensor may be envisaged.

Figure 3:
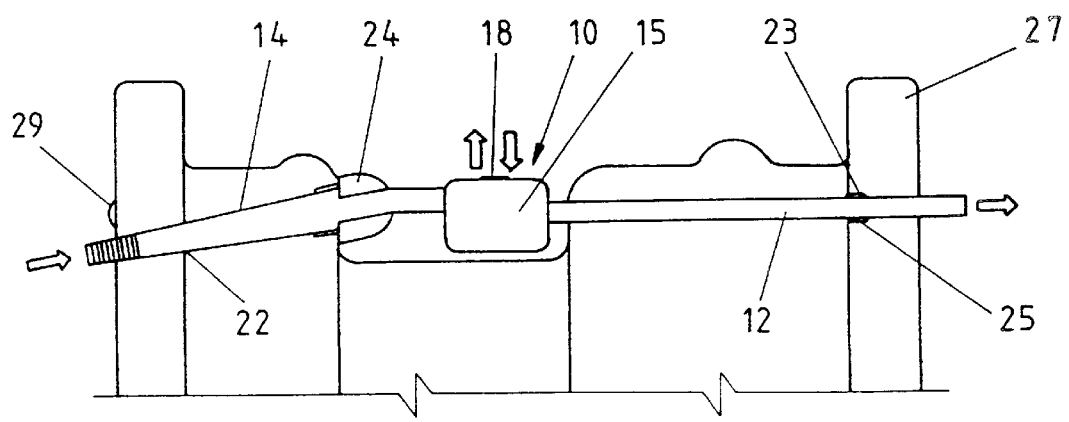
FIG. 3 is a view of another vehicle theft prevention device fitted to a wheel of a vehicle.

FIG. 3 shows an alternative arrangement of the components of the theft prevention device 10. The air release means 12 passes through the inwardly facing rim of the wheel 27. The infra-red sensor 29 is located on the outwardly facing rim of the wheel 27.

Referring to FIG. 2, in use the theft prevention device 10 is fitted to the rim of a wheel 27. The maintenance valve 14 is fitted through a hole 22 in the wheel 27, as is normally the case. The maintenance valve 14 is held in position with retaining piece 24. The air release means 12 is arranged to pass through a hole 23 in the wheel 27. The hole is so placed such that the mouth of the air release means 12 protrudes towards the centre of the wheel 27 and so that the mouth of the air release means 12 protrudes from an inner face of the wheel where it is both out of sight and cannot easily be reached. The air release means 12 is secured in position through the hole 23 with a retaining piece 25.

The air inlet/outlet of a tyre to be used with the device is attached to the opening 18 of the device 10.

The device 10 has deactivated and activated states. In its deactivated state, the solenoid controlled valve 21 is left open and the motion sensor 11 does not pass signals to the computer chip 19, so that any motion of the wheel has no effect on the device 10. The maintenance valve 14 can, therefore, be used in the normal way wherein air can be forced into or released from the valve, as desired. The infra-red sensor associated with the computer chip 19 remains ready to receive signals from the remote transmitter to activate the device 10.

The activated state of the theft prevention device 10 can be commenced by a signal from the remote transmitter (not shown), which signal is received by the sensor included in the computer chip 19. In the activated state the motion sensor 11 is energised. A movement of approximately one quarter of a turn of the wheel 27 will cause the movement sensor to pass a signal to the computer chip 19. The computer chip 19 will then activate the solenoid controlled valve 13 in the air release means 12 so that the valve 13 opens. Pressurised air in the tyre will be released from the tyre and the vehicle will be immobilised. On release the air may make screeching sound to indicate that the device has been triggered, thus acting as an alarm.

Additional features have been included in the vehicle theft prevention device 10 to render the device more secure. For instance, the secondary valve 21 in the maintenance valve 14 is closed when the device is activated. This feature prevents an unauthorised person from injecting foam or some similar substance into the tyre when the air therein has been discharged, or is being discharged, from the air release means 12. A person may wish to inject foam into the tyre to temporarily inflate the tyre so that the vehicle may be driven away. The secondary solenoid controlled valve 21 is left open whilst the theft prevention device 10 is deactivated so that air can be let into or out of the maintenance valve 14 as is usual. Alternatively, the secondary valve 21 may be closed until a specific signal is received by the infra-red sensor, which signal will open the secondary valve 21 to allow use of the maintenance valve 14. The air release means 12 may take the form of a one way valve so that foam or a similar substance cannot be injected into the tyre to temporarily inflate the tyre. The activation and deactivation means may be linked to an alarm system of a vehicle.

More than one wheel of a vehicle may be supplied with one or more of the devices 10, to reduce the likelihood of an unauthorised person tampering with the devices to inhibit their immobilising effect.

Although the means of activating and deactivating the devices 10 is by infra-red control in this example, it is envisaged that other methods may be used, such as an ultra-sonic transmitter receiver pairs.

The vehicle theft prevention device described in this specific description provides a means of immobilising a vehicle when an unauthorised person attempts to take the vehicle. A device is provided which can be easily activated a nd deactivated.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A vehicle theft prevention device comprising a motion sensing means for sensing the motion of a wheel of a vehicle, said motion sensing device providing an electrical signal indicative of the sensing of motion and discharge means responsive to receiving said electrical signal from said motion sensing means for discharging pressurized fluid from a tyre of the wheel when motion of the wheel is detected.

2. A vehicle theft prevention device as claimed in claim 1, in which the device additionally includes a maintenance valve.

3. A vehicle theft prevention device as claimed in claim 2, in which the maintenance valve and the discharge means are separate parts of the device.

4. A vehicle theft prevention device as claimed in either claim 2 or claim 3, in which the maintenance valve includes a secondary valve.

5. A vehicle theft prevention device as claimed in claim 4, in which said secondary valve is in addition to the means for adjusting the pressure in the tyre.

6. A vehicle theft prevention device as claimed in claim 4, in which the secondary valve is controllable electro-mechanically.

7. A vehicle theft prevention device as claimed in claim 1, in which the motion sensing means is electro-mechanical.

8. A vehicle theft prevention device as claimed in claim 1, in which the discharge means is arranged to emit an alarm sound when discharging fluid.

9. A vehicle theft prevention device as claimed in claim 1, in which the discharge means is arranged to be activated when the motion sensing means detects that the wheel has turned through approximately one quarter of a revolution.

10. A vehicle theft prevention device as claimed in claim 1, which includes a control means.

11. A vehicle theft prevention device as claimed in claim 10, in which the control means is connected to the motion sensing means.

12. A vehicle theft prevention device as claimed in either claim 10 or claim 11, in which the control means is connected to the discharge means.

13. A vehicle theft prevention device as claimed in claim 10, in which the control means is controls the discharge means dependent upon signals from the motion sensing means.

14. A vehicle theft prevention device as claimed in claim 10, in which the control means causes pressurised fluid to be discharged from the tyre when the motion sensing means senses motion.

15. A vehicle theft prevention device as claimed in claim 1, in which the discharge means includes a valve.

16. A vehicle theft prevention device as claimed in claim 15, in which the valve is controllable electro-mechanically.

17. A vehicle theft prevention device as claimed in claim 1, in which the discharge means is arranged to protrude from an inner portion of the wheel.

18. A vehicle theft prevention device as claimed in claim 1, in which the discharge means protrudes substantially towards the rotational axis of the wheel.

19. A vehicle theft prevention device as claimed in claim 1, which is arranged to be switched between an activated state, where the discharge means is arranged to discharge fluid from the tyre and a deactivated state.

20. A vehicle theft prevention device as claimed in claim 19, in which the device is switched between activated and deactivated state by remote control means.

21. A vehicle theft prevention device as claimed in claim 19, in which in the deactivated state, the device is arranged to utilise substantially no power.

22. A vehicle theft prevention device as claimed in either claim 19 or claim 21, in which in the deactivated state the device may be arranged such that the motion sensing means cannot activate the discharge means.

23. A vehicle theft prevention device comprises motion sensing means for sensing the motion of a wheel of a vehicle and discharge means for discharging pressurized fluid from a tyre of the wheel when motion of the wheel is detected, said device having a maintenance valve including a secondary valve and wherein said device is arranged to be switched between an activated state, where the discharge means is arranged to discharge fluid from the tyre and a deactivated state, and when said device is in its deactivated state, the secondary valve in the maintenance valve may remain open.

24. A vehicle theft prevention device as claimed in claim 23, in which the secondary valve in the maintenance valve remains closed independently of the activated or deactivated status of the device until a signal is passed to the secondary valve in the maintenance valve to open said secondary valve.

25. A method for preventing the theft of a vehicle comprising the steps of providing motion sensing means for sensing the motion of a wheel of a vehicle and generating an electrical signal upon sensing motion, and providing a discharge means responsive to the electrical signal from the motion sensing means for discharging pressurized fluid from a tyre of the vehicle wheel when motion of the wheel is detected.

26. A vehicle theft prevention device comprises motion sensing means for sensing the motion of a wheel of a vehicle and discharge means for discharging pressurized fluid from a tyre of the wheel when motion of the wheel is detected and wherein said device is arranged such that the wheel restricts access to said discharge means.

* * * * *